US011051034B2

(12) United States Patent
Han et al.

(10) Patent No.: US 11,051,034 B2
(45) Date of Patent: Jun. 29, 2021

(54) HISTORY-BASED MOTION VECTOR PREDICTOR

(71) Applicant: QUALCOMM Incorporated, San Diego, CA (US)

(72) Inventors: Yu Han, San Diego, CA (US);
Wei-Jung Chien, San Diego, CA (US);
Han Huang, San Diego, CA (US);
Chao-Hsiung Hung, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/593,388

(22) Filed: Oct. 4, 2019

(65) Prior Publication Data

US 2020/0112741 A1 Apr. 9, 2020

Related U.S. Application Data

(60) Provisional application No. 62/742,890, filed on Oct. 8, 2018.

(51) Int. Cl.
*H04N 7/12* (2006.01)
*H04N 19/52* (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC ............................... H04N 19/52; H04N 19/56
See application file for complete search history.

(56) References Cited

U.S. PATENT DOCUMENTS 7,567,617 B2   7/2009 Holcomb
8,358,698 B2   1/2013 Shi et al.
(Continued)

FOREIGN PATENT DOCUMENTS

EP   3343925 A1   7/2018
WO   2017197126 A1   11/2017

OTHER PUBLICATIONS

Chien W-J., et al., "CE4-related: Modification on History-based Mode Vector Prediction", 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0401, Oct. 5, 2018 (Oct. 5, 2018), XP030194900, 5 Pages, Retrieved from the Internet: URL: http://phenix.int-evry.fr/jvet/doc_end_user/documents/12_Macao/wg11/JVET-L0401-v4.zip JVET-L0401_r3.docx [retrieved on Oct. 5, 2018] abstract section 2 with its sub-section.

(Continued)

*Primary Examiner* — Young Lee
(74) *Attorney, Agent, or Firm* — Polsinelli LLP

(57) ABSTRACT

Systems and techniques for processing video data include a history-based motion vector predictor (HMVP) table with two or more HMVP candidates, where a first entry of the HMVP table associated with a first index value includes a first HMVP candidate and a second entry of the HMVP table associated with a second index value includes a second HMVP candidate, the first index value being lower than the second index value. For an advanced motion vector prediction (AMVP) candidate list, one or more HMVP candidates from the HMVP table are selected in a reverse order, where the second HMVP candidate is selected before the first HMVP candidate according to the reverse order. The selected one or more HMVP candidates are added to the AMVP candidate list. The AMVP candidate list can be used to perform AMVP for the one or more blocks of video data.

28 Claims, 10 Drawing Sheets

(51) Int. Cl.
  *H04N 19/176* (2014.01)
  *H04N 19/56* (2014.01)
  *H04N 19/132* (2014.01)
  *H04N 19/105* (2014.01)
  *H04N 19/159* (2014.01)
  *H04N 19/172* (2014.01)

(52) U.S. Cl.
  CPC ......... *H04N 19/159* (2014.11); *H04N 19/172* (2014.11); *H04N 19/176* (2014.11); *H04N 19/56* (2014.11)

(56) References Cited

U.S. PATENT DOCUMENTS

| | | |
|---|---|---|
| 9,491,458 B2 | 11/2016 | Tu et al. |
| 9,609,346 B2 | 3/2017 | Lin et al. |
| 2017/0339425 A1 | 11/2017 | Jeong et al. |

OTHER PUBLICATIONS

International Search Report and Written Opinion—PCT/US2019/055004—ISA/EPO—dated Apr. 23, 2020.

Koo M., et al., "Description of SDR video coding technology proposal by LG Electronics", 10. JVET Meeting; Apr. 10, 2018-Apr. 20, 2018; San Diego; (The Joint Video Exploration Team of ISO/IEC JTC1/SC29/WG11 and ITU-T SG.16 ); URL:http://Phenix.Int-Evry.Fr/Jvet/ , No. JVET-J0017, Apr. 3, 2018 (Apr. 3, 2018), KP030151177, 70 pages, Section 2.1.8 Intra prediction.

Lee H., et al., "Non-CE4: HMVP Unification Between the Merge and MVP List", 14. JVET Meeting; Mar. 19-27, 2019; Geneva; (The Joint Video Exploration Team of ISO/IEC JTC1/SC29/WG11 and ITU-T SG.16), No. JVET-N0373-v2, Mar. 21, 2019, 6 Pages, XP030204233, Retrieved from the Internet: URL: http://phenix.int-evry.fr/jvet/doc_end_user/documents/14_Geneva/wg11/JVET-N0373-v2.zip JVET-N0373_v2.docx [retrieved on Mar. 21, 2019] the whole document.

Partial International Search Report—PCT/US2019/055004—ISA/EPO—dated Jan. 8, 2020.

Zhang (Bytedance) L., et al., "CE4-Related: History-Based Motion Vector Prediction", 11. JVET Meeting, Jul. 11, 2018-Jul. 18, 2018, Ljubljana, (The Joint Video Exploration Team of ISO/IEC JTC1/SC29/WG11 and ITU-TSG.16), No. JVET-K0104-v5, Jul. 18, 2018 (Jul. 18, 2018), 7 Pages, XP030200019, Retrieved from the Internet: URL: http://phenix.int-evry.fr/jvet/doc_end_user/documents/11_Ljubljana/wg11/JVET-K0104-v5.zip JVET-K0104_r4.docx [retrieved on Jul. 18, 2018] abstract sections 1 and 2.

Zhang L., et al., "CE4: History-based Motion Vector Prediction (Test 4.4.7)", 12. JVET Meeting; Oct. 3, 2018-Oct. 12, 2018, Macao, (The Joint Video Exploration Team of ISO/IEC JTC1/SC29/WG11 and ITU-T SG.16), No. JVET-L0266, Oct. 4, 2018 (Oct. 4, 2018), 6 pages, XP030194670,URL: http://phenix.int-evry.fr/jvet/doc_end_user/documents/12_Macao/wg11/JVET-L0266-v3.zip JVET-L0266 r1.docx [retrieved on Oct. 4, 2018] Sections 2 and 3.

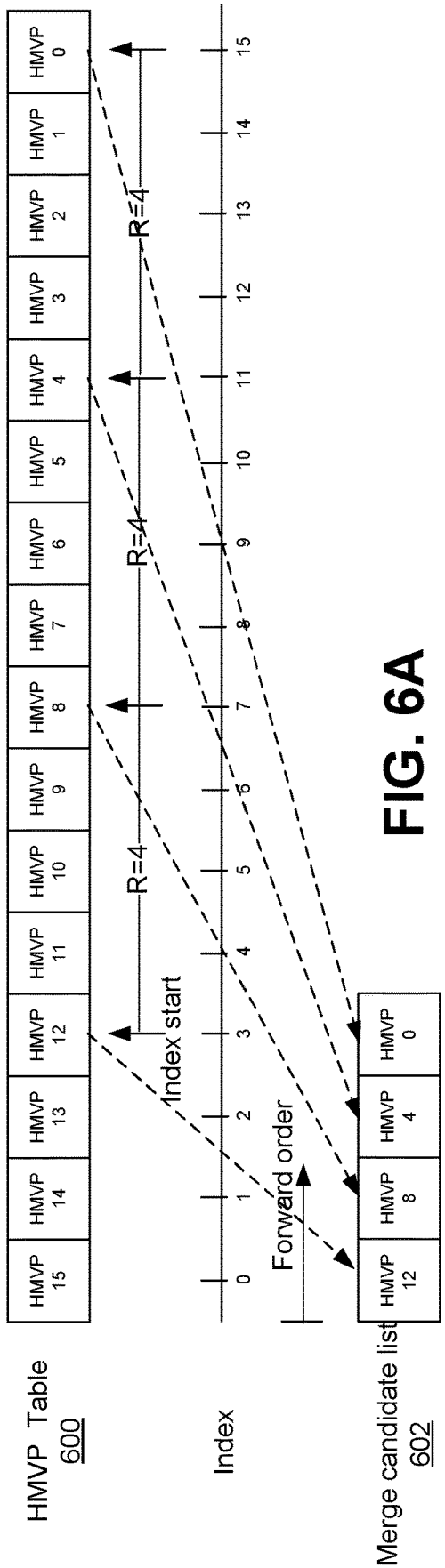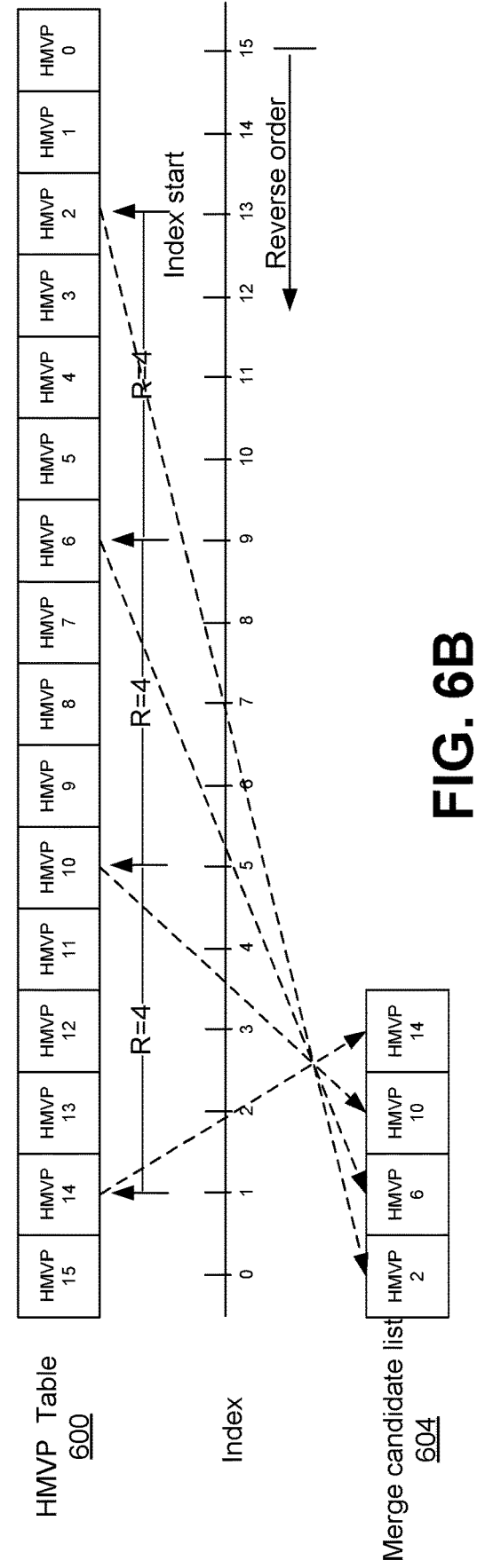
FIG. 6A
FIG. 6B

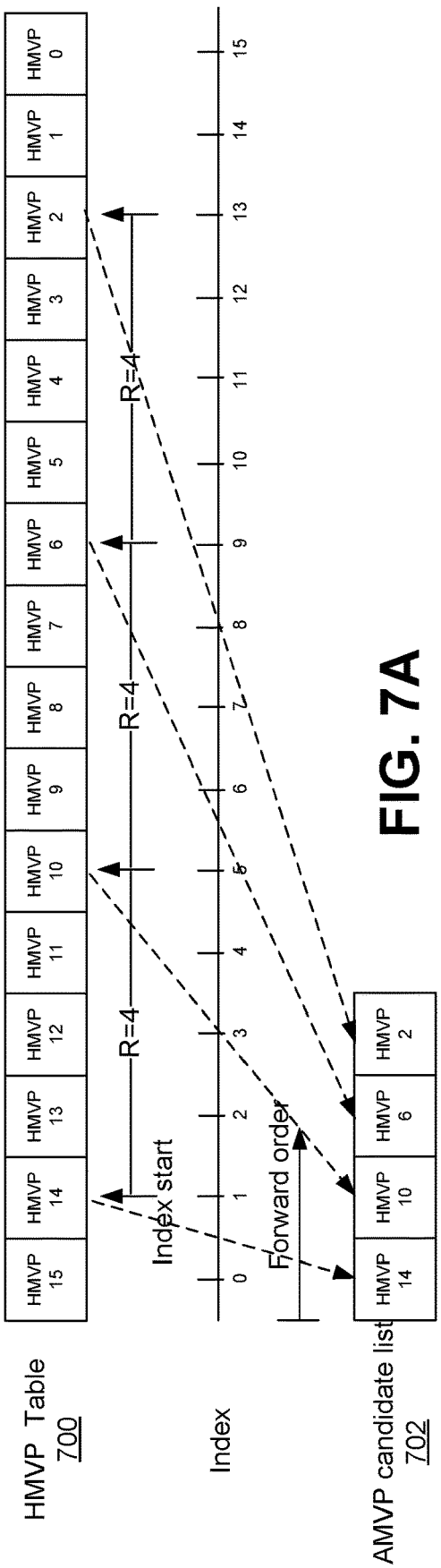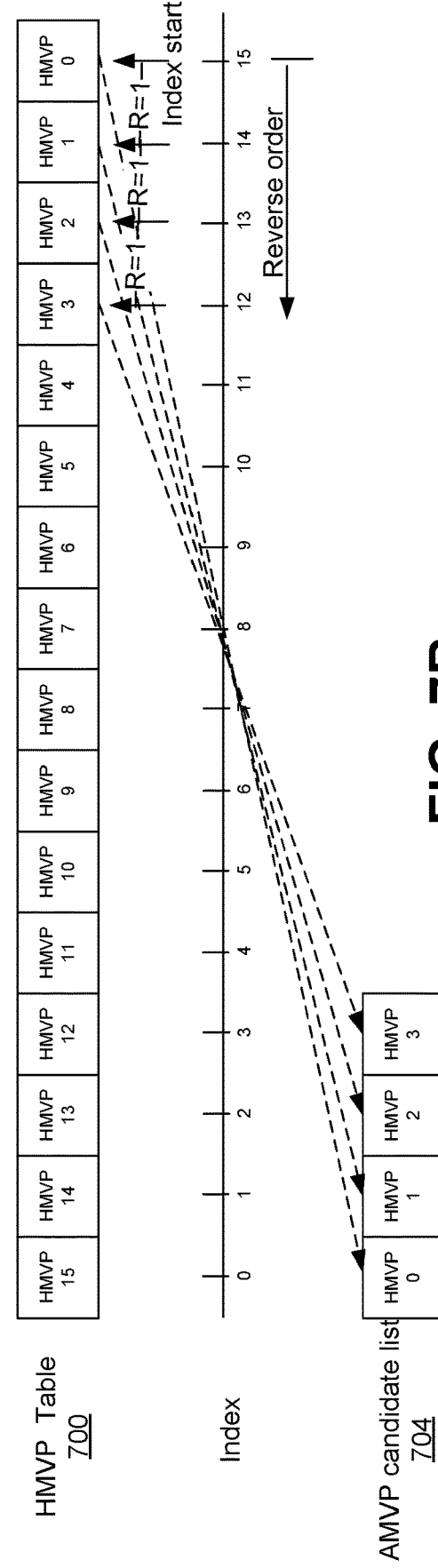

HISTORY-BASED MOTION VECTOR PREDICTOR

CROSS-REFERENCES TO RELATED APPLICATIONS

This application claims the benefit of U.S. Provisional Application No. 62/742,890, filed on Oct. 8, 2018, which is hereby incorporated by reference, in its entirety and for all purposes.

FIELD

This application is related to video coding and compression. For example, systems and methods are described that provide improvements on history-based motion vector predictors.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include High-Efficiency Video Coding (HEVC), Advanced Video Coding (AVC), MPEG-2 Part 2 coding (MPEG stands for moving picture experts group), VP9, Alliance of Open Media (AOMedia) Video 1 (AV1), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for improving prediction techniques in video codecs. For example, the techniques described herein can include decoder-side motion vector refinement. In some examples, the techniques may be applied to any of the existing video codecs, such as HEVC (High Efficiency Video Coding), and/or VVC (Versatile Video Coding), or may be an efficient coding tool in any future video coding standards. In some examples, the disclosed techniques can be utilized in Intra-Block Copy (IBC) prediction.

In some examples, a history-based motion vector prediction can be performed where one or more motion vector predictors for one or more blocks can be obtained or predicted from a list of previously decoded motion vectors. In some examples, a History-based Motion Vector Predictor (HMVP) table can include HMVP candidates that may be used in different types of inter-prediction modes, such as a merge mode, an Advanced Motion Vector Prediction (AMVP) mode, and/or other inter-prediction modes. In some cases, the different inter-prediction modes can use the same or different methods to select candidates from the HMVP table. In some examples, an HMVP table can include HMVP candidates that may be used in an IBC mode.

In some examples, selection of HMVP candidates from the HMVP table for the different prediction modes can be based on a selection order associated with the HMVP candidates. The HMVP candidates may be inserted into the HMVP table in a first-in-first-out (FIFO) manner, where older or less recent HMVP candidates may be inserted into the HMVP table before younger or more recent HMVP candidates. In some examples, a merge candidate list can be constructed from the HMVP table for the merge mode by selecting one or more HMVP candidates from the HMVP table in a forward order in which more recent HMVP candidates are selected before less recent HMVP candidates. In some examples, the most recent HMVP candidate in the HMVP table may have less correlation with a current block being predicted using the AMVP mode than a less recent HMVP candidate. In some examples, using the less recent HMVP candidates for the AMVP mode prediction can lead to coding efficiencies. Accordingly, in some examples, an AMVP candidate list can be constructed in the AMVP mode, by selecting one or more HMVP candidates from the HMVP table in a reverse order in which less recent HMVP candidates are selected before more recent HMVP candidates.

According to at least one example, a method of processing video data is provided. The method includes obtaining one or more blocks of video data. The method further includes populating a History-based Motion Vector Predictor (HMVP) table with two or more HMVP candidates, wherein a first entry of the HMVP table associated with a first index value comprises a first HMVP candidate and a second entry of the HMVP table associated with a second index value comprises a second HMVP candidate, the first index value being lower than the second index value in an index order. The method further includes selecting, for an Advanced Motion Vector Prediction (AMVP) candidate list, one or more HMVP candidates from the HMVP table in a reverse order, wherein the second HMVP candidate is selected before the first HMVP candidate according to the reverse order. The method further includes adding the selected one or more HMVP candidates to the AMVP candidate list, the AMVP candidate list being used to perform AMVP for the one or more blocks.

In another example, an apparatus for processing video data is provided. The apparatus includes a memory and a processor implemented in circuitry. The apparatus is configured to and can obtain one or more blocks of video data. The apparatus is configured to and can populate a history-based motion vector predictor (HMVP) table with two or more HMVP candidates, wherein a first entry of the HMVP table associated with a first index value comprises a first HMVP candidate and a second entry of the HMVP table associated with a second index value comprises a second HMVP candidate, the first index value being lower than the second index value. The apparatus is configured to and can select, for an advanced motion vector prediction (AMVP) candidate list, one or more HMVP candidates from the HMVP table in a reverse order, wherein the second HMVP candidate is selected before the first HMVP candidate according to the reverse order. The apparatus is configured to and can add the selected one or more HMVP candidates to the AMVP candidate list, the AMVP candidate list being used to perform AMVP for the one or more blocks.

In another example, a non-transitory computer-readable medium is provided that has stored thereon instructions that, when executed by one or more processors, cause the one or more processors to: obtain one or more blocks of video data; populate a history-based motion vector predictor (HMVP) table with two or more HMVP candidates, wherein a first entry of the HMVP table associated with a first index value comprises a first HMVP candidate and a second entry of the HMVP table associated with a second index value comprises a second HMVP candidate, the first index value being lower than the second index value; select, for an advanced motion vector prediction (AMVP) candidate list, one or more HMVP candidates from the HMVP table in a reverse order, wherein the second HMVP candidate is selected before the first HMVP candidate according to the reverse order; and add the selected one or more HMVP candidates to the AMVP candidate list, the AMVP candidate list being used to perform AMVP for the one or more blocks.

In another example, an apparatus for processing video data is provided. The apparatus includes: means for obtaining one or more blocks of video data; means for populating a history-based motion vector predictor (HMVP) table with two or more HMVP candidates, wherein a first entry of the HMVP table associated with a first index value comprises a first HMVP candidate and a second entry of the HMVP table associated with a second index value comprises a second HMVP candidate, the first index value being lower than the second index value; means for selecting, for an advanced motion vector prediction (AMVP) candidate list, one or more HMVP candidates from the HMVP table in a reverse order, wherein the second HMVP candidate is selected before the first HMVP candidate according to the reverse order; and means for adding the selected one or more HMVP candidates to the AMVP candidate list, the AMVP candidate list being used to perform AMVP for the one or more blocks.

In some aspects of the methods, apparatuses, and computer-readable medium described above the first HMVP candidate comprises motion information decoded at a first time and the second HMVP candidate comprises motion information decoded at a second time, wherein the first time is later in time than the second time.

In some aspects of the methods, apparatuses, and computer-readable medium described above, selecting the one or more HMVP candidates from the HMVP table in the reverse order comprises selecting the one or more HMVP candidates from consecutive entries of the HMVP table associated with consecutive index values, without performing subsampling of the entries of the HMVP table during the selection.

Some aspects of the methods, apparatuses, and computer-readable medium described above further include selecting, for a merge candidate list, one or more HMVP candidates from the HMVP table in a forward order, wherein the first HMVP candidate is selected before the second HMVP candidate according to the forward order; and adding the selected one or more HMVP candidates to the merge candidate list, the merge candidate list being used to perform merge prediction for the one or more blocks.

In some aspects of the methods, apparatuses, and computer-readable medium described above, selecting the one or more HMVP candidates from the HMVP table in the forward order comprises sub sampling of entries of the HMVP table using a sub sampling rate, wherein a separation based on the subsampling rate is maintained between index values associated with entries of the HMVP table from which consecutive HMVP candidates are selected.

In some aspects of the methods, apparatuses, and computer-readable medium described above, adding the selected one or more HMVP candidates to the merge candidate list comprises adding the selected one or more HMVP candidates to the merge candidate list after adding a temporal motion vector predictor (TMVP) candidate to the merge candidate list.

Some aspects of the methods, apparatuses, and computer-readable medium described above, further include determining that the size of the neighboring block is greater than or equal to the minimum size threshold; and using the affine motion vector of the neighboring block as an affine motion vector of the current block, based on the size of the neighboring block being greater than or equal to the minimum size threshold.

In some aspects of the methods, apparatuses, and computer-readable medium described above, the two or more HMVP candidates comprise motion information for both prediction directions of bi-direction prediction.

In some aspects of the methods, apparatuses, and computer-readable medium described above, at least two HMVP tables are used in the AMVP mode with bi-prediction.

In some aspects of the methods, apparatuses, and computer-readable medium described above, a first HMVP table is used for a first reference picture list, and wherein a second HMVP table is used for a second reference picture list.

In some aspects of the methods, apparatuses, and computer-readable medium described above, the AMVP includes an intra-block copy AMVP prediction mode.

In some aspects of the methods, apparatuses, and computer-readable medium described above, the affine motion vector of the neighboring block includes one or more scaling variables and one or more position variables.

Some aspects of the methods, apparatuses, and computer-readable medium described above, include an encoder.

Some aspects of the methods, apparatuses, and computer-readable medium described above include a decoder, where the video data is obtained from an encoded video bitstream.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 6A and FIG. 6B are diagrams illustrating an example of creating a merge candidate list from a history-based motion vector predictor (HMVP) table, in accordance with some examples;

FIG. 7A and FIG. 7B are diagrams illustrating an example of creating an advanced motion vector prediction (AMVP) candidate list from a history-based motion vector predictor (HMVP) table, in accordance with some examples;

DETAILED DESCRIPTION

Figure 1:
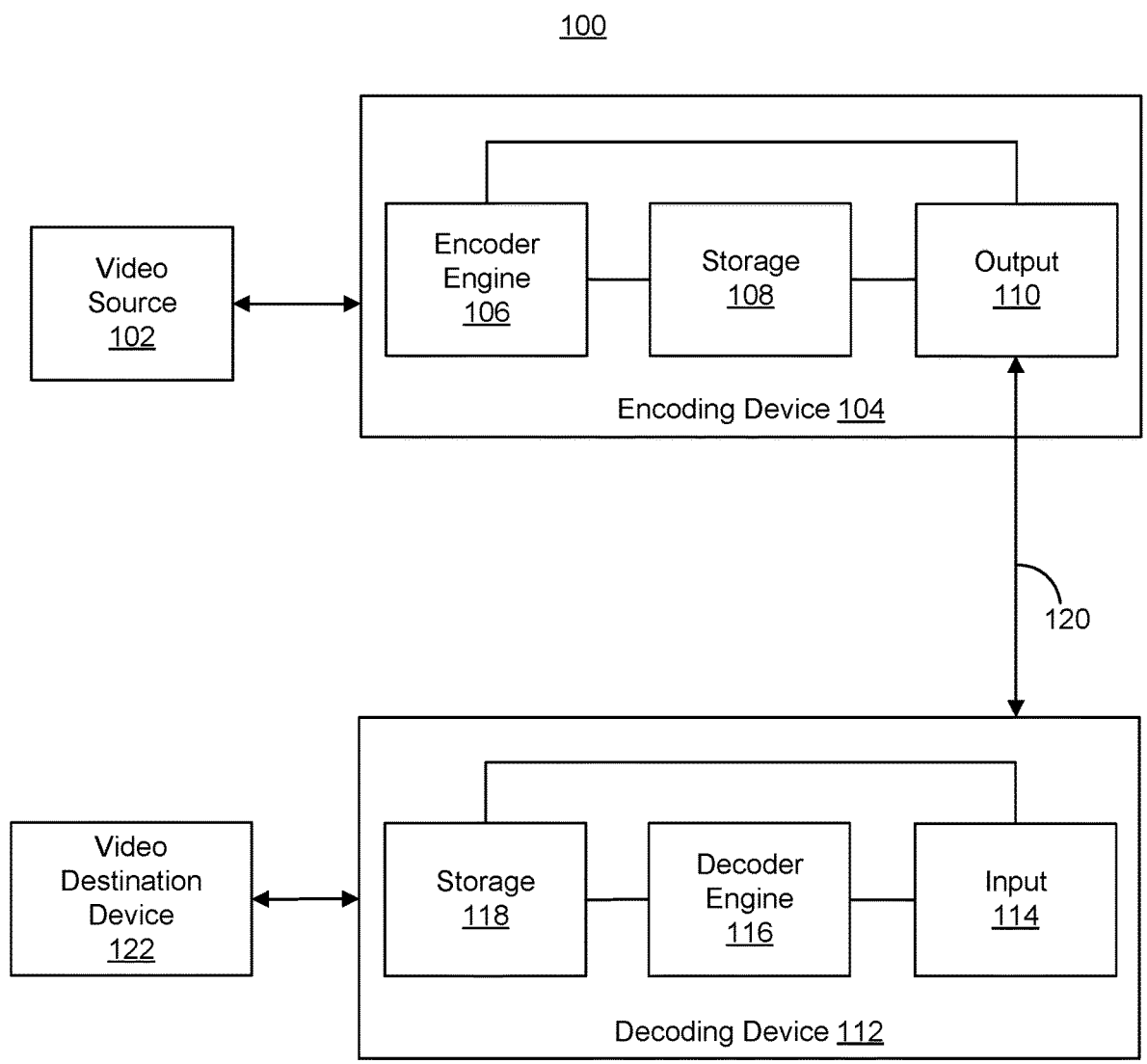
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks (e.g., sub-blocks). Video blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree units (CTUs), coding units, prediction units (PUs), transform units (TUs), or the like). In some cases, a unit may indicate a coding logical unit that is encoded in a bitstream, while a block may indicate a portion of a video frame buffer a process is targeted to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction error can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As described in more detail below, systems, apparatuses, methods (also referred to as processes), and computer-readable media are described herein for providing improvements on history-based motion vector predictors. The techniques described herein can be applied to one or more of a variety of block-based video coding techniques in which video is reconstructed on a block-by-block basis. For example, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the Joint Exploration Model (JEM), VP9, AV1, and/or other video coding standards in development or to be developed.

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a Head-Mounted Display (HMD), a Heads-Up Display (HUD), smart glasses (e.g., Virtual Reality (VR) glasses, Augmented Reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, Graphics Processing Units (GPUs), Digital Signal Processors (DSPs), Central Processing Units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more Random Access Memory (RAM) components, Read-Only Memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a Universal Serial Bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, three-dimensional (3D) video coding extension (3D-HEVC), multiview extension (MV-HEVC), and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a Joint Exploration Video Team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, High-Dynamic-Range (HDR) video, among others). VP9 and Alliance of Open Media (AOMedia) Video 1 (AV1) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of Access Units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An Access Unit (AU) includes one or more coded pictures and control information corresponding to the coded pictures that share the same output time. Coded slices of pictures are encapsulated in the bitstream level into data units called Network Abstraction Layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including Video Coding Layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a Video Parameter Set (VPS), a Sequence Parameter Set (SPS), and a Picture Parameter Set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into Coding Tree Blocks (CTBs) of luma samples and chroma samples. A CTB of luma samples and one or more CTBs of chroma samples, along with syntax for the luma and chroma samples, are referred to as a Coding Tree Unit (CTU). A CTU may also be referred to as a "tree block" or a "largest coding unit" (LCU). A CTU is the basic processing unit for HEVC encoding. A CTU can be split into multiple Coding Units (CUs) of varying sizes. A CU contains luma and chroma sample arrays that are referred to as coding blocks (CBs).

The luma and chroma CBs can be further split into Prediction Blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using Transform Units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as Residual Quad Tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of Coding Tree Units (CTUs) (where a CTB of luma samples and one or more CTBs of chroma samples, along with syntax for the luma and chroma samples, are referred to as a CTU). The video coder can partition a CTU according to a tree structure, such as a QuadTree-Binary Tree (QTBT) structure or Multi-Type Tree (MTT) structure. The QTBT structure removes the concepts of multiple partition types, such as the separation between CUs, PUs, and TUs of HEVC. The QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luma and chroma components, while in other examples, the video coder can use two or more QTBT or MTT structures, such as one QTBT or MTT structure for the luma component and another QTBT or MTT structure for both chroma components (or two QTBT or MTT structures for respective chroma components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The 35 modes of intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra-prediction mode and associated names | |
|---|---|
| Intra-prediction mode | Associated name |
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., list 0, list 1, or list C) for the motion vector, or any combination thereof.

After performing prediction using intra-prediction and/or inter-prediction, the encoding device 104 can perform transformation and quantization. For example, following prediction, the encoder engine 106 may calculate residual values corresponding to a PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on Discrete Cosine Transform (DCT), Discrete Sine Transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture (e.g., PUs) and prediction values corresponding to the PUs. The encoder engine 106 may form one or more TUs including the residual data for a CU (which includes the PUs), and may then transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, Radio Frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, Digital Signal Line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a Decoded Picture Buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, Network Attached Storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "codec." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A Picture Order Count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a Coding Tree Block (CTB) or Coding Tree Unit (CTU). A CTB contains a quad-tree, the nodes of which are coding units. The size of a CTB can range from 16×16 pixels to 64×64 pixels in the HEVC main profile. In some cases, 8×8 pixel CTB sizes can be supported. A CTB may be recursively split into Coding Units (CU) in a quad-tree manner. A CU could be the same size as a CTB and as small as 8×8 pixels. In some cases, each coding unit is coded with one mode, such as either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU, which can be derived with a unique inter-prediction mode. For example, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there are two inter-prediction modes for a Prediction Unit (PU), including merge mode and Advanced Motion Vector Prediction (AMVP) mode. Skip is considered as a special case of merge. In either AMVP mode or merge mode, a Motion Vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MV Predictor (MVP) index to the MV candidate list since the AMVP candidate contains only a motion vector. In AMVP mode, the predicted motion vectors can be further refined.

A merge candidate may correspond to a full set of motion information, while an AMVP candidate may contain one motion vector for a specific prediction direction and a reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more Motion Vector Predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

Figure 2B:
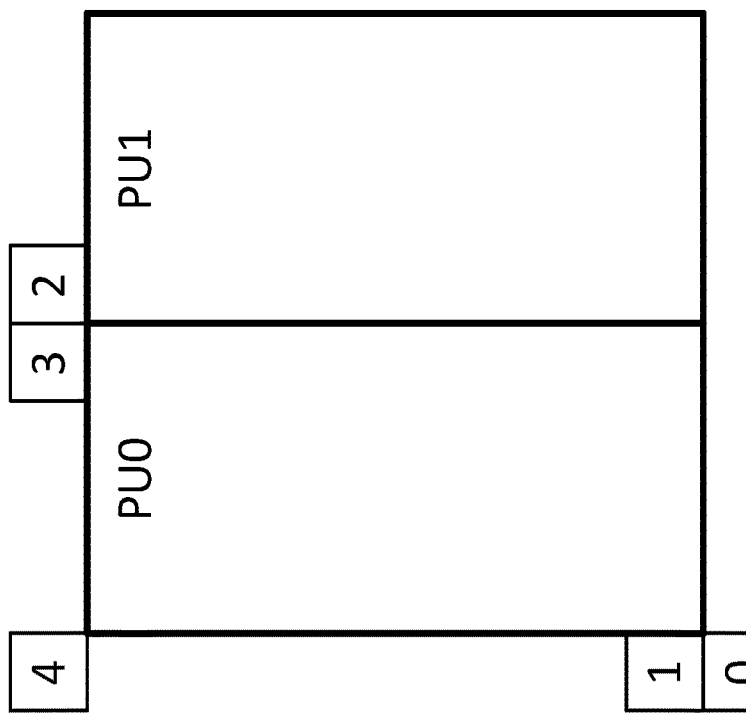
FIG. 2B is a conceptual diagram illustrating example spatial neighboring motion vector candidates for an advanced motion vector prediction (AMVP) mode, in accordance with some examples.
Figure 2A:
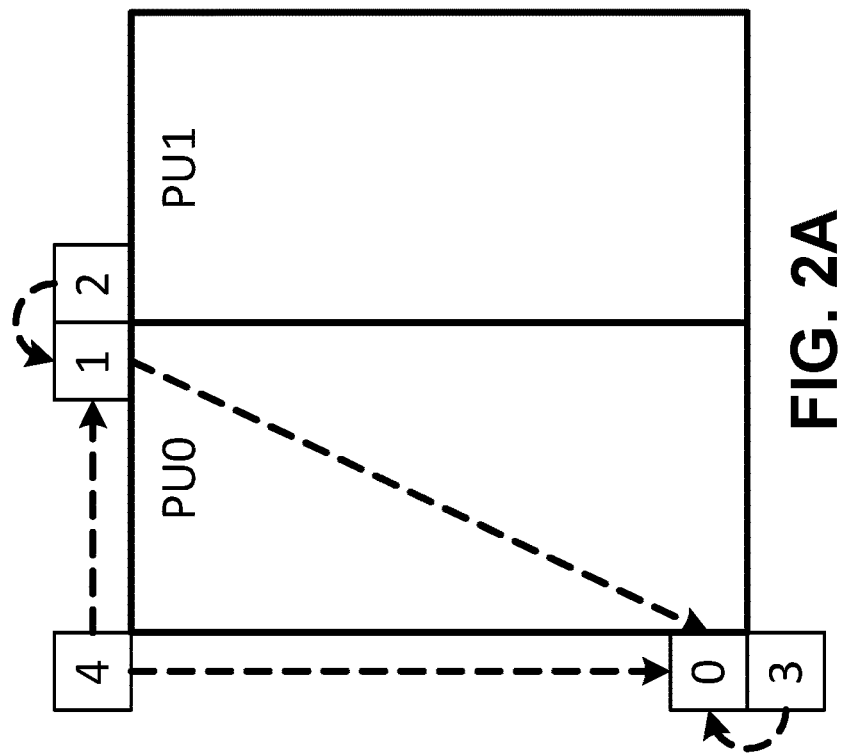
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring Motion Vector (MV) candidates for merge mode. FIG. 2B illustrates spatial neighboring Motion Vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. In some examples, these spatially neighboring motion data positions are immediately adjacent spatially neighboring motion data positions for a current block such as the PU0. The MV candidates can be ordered in the merging candidate list in the order shown by the numbers 0-4. For example, the positions and order can include: left position (0), above position (1), above right position (2), below left position (3), and above left position (4). In some examples, a causal relationship exists between the spatially neighboring motion data positions and the current block based on the order in which the merge candidate list is constructed using the spatially neighboring motion data positions. In some examples, the spatially neighboring motion data positions 0-4 can also be referred to as immediately adjacent causally neighboring motion data positions.

In AMVP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated. An AMVP candidate list can be constructed using the available candidates, which may be appropriately scaled. In some examples, the AMVP candidate list can include the available candidates among the causally neighboring motion data positions.

Figure 3A:
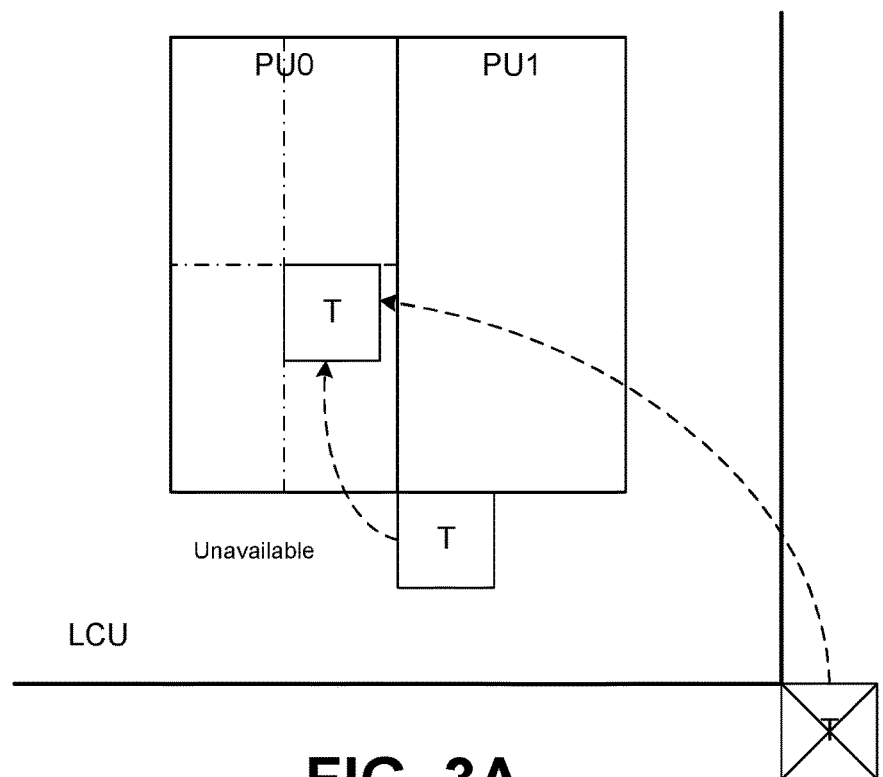
FIG. 3A is a conceptual diagram illustrating an example temporal motion vector predictor (TMVP) candidate, in accordance with some examples.
Figure 3B:
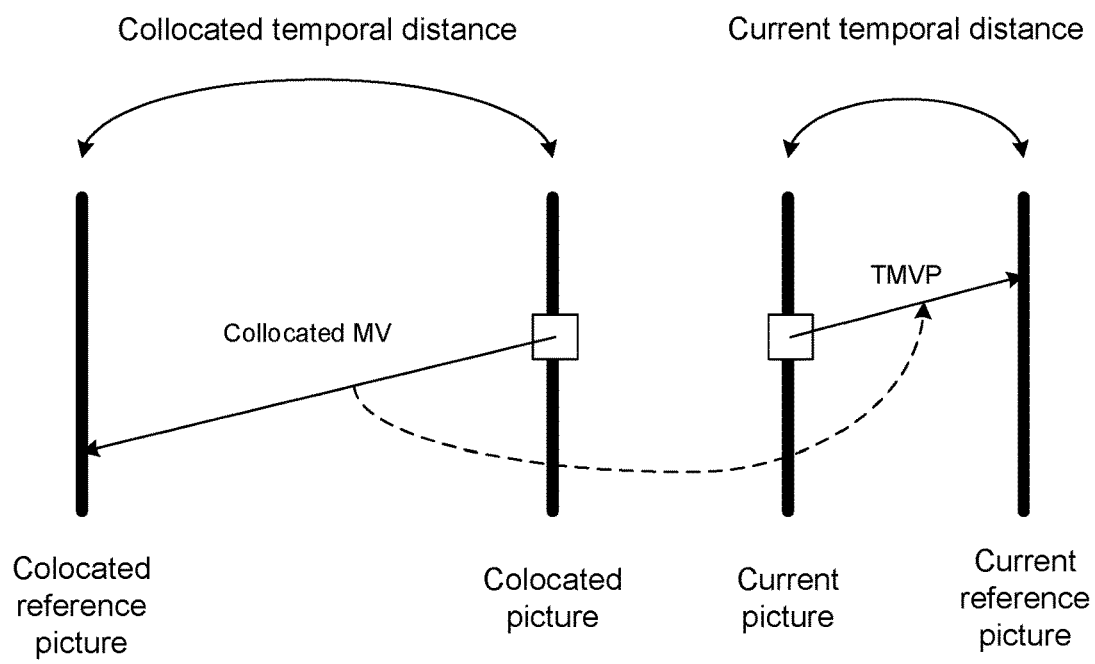
FIG. 3B is a conceptual diagram illustrating an example of motion vector scaling, in accordance with some examples.

FIG. 3A and FIG. 3B include conceptual diagrams illustrating temporal motion vector prediction in HEVC. A Temporal Motion Vector Predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are also covered in the HEVC, VVC, and other video coding specifications. For example, one aspect includes motion vector scaling. In motion vector scaling, a value of motion vectors is assumed to be proportional to a distance between pictures in presentation time. In some examples, a first motion vector can be associated with two pictures, including a first reference picture and a first containing picture which includes the first motion vector. The first motion vector can be utilized to predict a second motion vector. For predicting the second motion vector, a first distance between the first containing picture and the first reference picture of the first motion can be calculated based on Picture Order Count (POC) values associated with the first reference picture and the first containing picture.

A second reference picture and a second containing picture may be associated with the second motion vector to be predicted, where the second reference picture can be different from the first reference picture and the second containing picture can be different from the first containing picture. A second distance can be calculated between the second reference picture and the second containing picture based POC values associated with the second reference picture and the second containing picture, where the second distance can be different from the first distance. For predicting the second motion vector, the first motion vector can be scaled based on the first distance and the second distance. For a spatially neighboring candidate, the first containing picture and the second containing picture of the first motion vector and the second motion vector, respectively, can be the same, while the first reference picture and the second reference picture may be different. In some examples, the motion vector scaling can be applied for TMVP and AMVP modes, for the spatial and temporal neighboring candidates.

Another aspect of motion prediction includes artificial motion vector candidate generation. For example, if a motion vector candidate list is not complete, artificial motion vector candidates are generated and inserted at the end of the motion vector candidate list until all candidates are obtained. In the merge mode, there are two types of artificial MV candidates: a first type which includes combined candidates derived only for B-slices; and a second type which includes zero candidates used only for AMVP if the first type does not provide sufficient artificial candidates. For each pair of candidates that are already in the motion vector candidate list and that have relevant motion information, bi-directional combined motion vector candidates can be derived by a combination of the motion vector of a first candidate referring to a picture in the list 0 and the motion vector of a second candidate referring to a picture in the list 1.

Another aspect of the merge and AMVP modes includes a pruning process for candidate insertion. For example, candidates from different blocks may happen to be the same, which decreases the efficiency of a merge candidate list and/or an AMVP candidate list. A pruning process can be applied to solve this problem. The pruning process includes comparing a candidate against the candidates already present in the current candidate list to avoid inserting identical or duplicate candidates. To reduce the complexity of the comparison, the pruning process can be performed for less than all potential candidates to be inserted in the candidate list.

In some examples, enhanced motion vector predictions can be implemented. For instance, some inter-coding tools are specified in video coding standards such as VVC, according to which the candidate list of motion vector prediction or merge prediction for a current block can be derived or refined. Examples of such approaches are described below.

A history-based motion vector prediction is a motion vector prediction method where one or more MV predictors for a current block can be obtained or predicted from a list of previously decoded MVs in addition to those in immediately adjacent causally neighboring motion fields. The MV predictors in the list of previously decoded MVs are referred to as HMVP candidates. The HMVP candidates can include motion information associated with inter-coded blocks. An HMVP table with multiple HMVP candidates can be maintained during an encoding and/or decoding process for a slice. In some examples, the HMVP table can be dynamically updated. For example, after decoding an inter-coded block, the HMVP table can be updated by adding the associated motion information of the decoded inter-coded block to the HMVP table as a new HMVP candidate. In some examples, the HMVP table can be emptied when a new slice is encountered.

Figure 4:
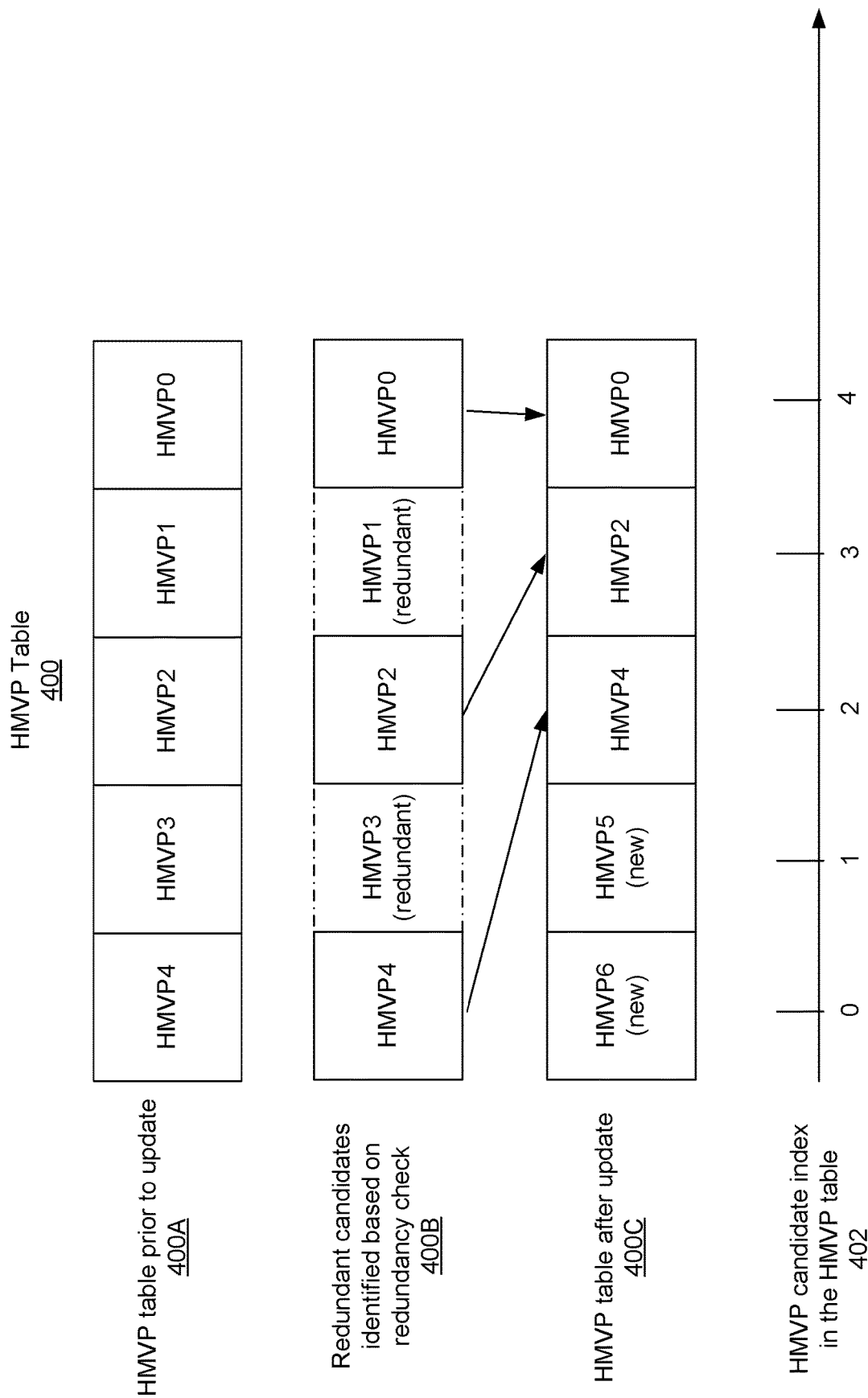
FIG. 4 is a diagram illustrating an example history-based motion vector predictor (HMVP) table, in accordance with some examples.

FIG. 4 is a block diagram illustrating an example of an HMVP table 400. The HMVP table 400 can be implemented as a storage device managed using a First-In-First-Out (FIFO) rule. For example, HMVP candidates which include MV predictors can be stored in the HMVP table 400. The HMVP candidates can be stored in an order in which they are encoded or decoded. In an example, the order in which the HMVP candidates are stored in the HMVP table 400 can correspond to a time at which the HMVP candidates are constructed. For example, when implemented in a decoder such as the decoding device 112, an HMVP candidate can be constructed to include motion information of a decoded inter-coded block. In some examples, one or more HMVP candidates from the HMVP table 400 can include the motion vector predictors which can be used for motion vector prediction of a current block to be decoded. In some examples, one or more HMVP candidates can include one or more such previously decoded blocks which can be stored in the time order in which they were decoded in one or more entries of the HMVP table 400 in a FIFO manner.

An HMVP candidate index 402 is shown to be associated with the HMVP table 400. The HMVP candidate index 402 can identify the one or more entries of the HMVP table 400. The HMVP candidate index 402 is shown to include the index values 0 to 4 according to an illustrative example, where each of the index values of the HMVP candidate index 402 is associated with a corresponding entry. The HMVP table 400 can include more or less entries than those shown and described with reference to FIG. 4 in other examples. As HMVP candidates are constructed, they are populated in the HMVP table 400 in a FIFO manner. For example, as the HMVP candidates are decoded, they are inserted into the HMVP table 400 in one end and moved sequentially through the entries of the HMVP table 400 until they exit the HMVP table 400 from another end. Accordingly, a memory structure such as a shift register can be used to implement the HMVP table 400 in some examples. In an example, the index value 0 can point to a first entry of the HMVP table 400, where the first entry can correspond to a first end of the HMVP table 400 at which the HMVP candidates are inserted. Correspondingly, the index value 4 can point to a second entry of the HMVP table 400, where the second entry can correspond to a second end of the HMVP table 400 from which the HMVP candidates exit or are emptied from the HMVP table 400. Accordingly, an HMVP candidate which is inserted at the first entry at the index value 0 can traverse the HMVP table 400 to make room for newer or more recently decoded HMVP candidates until the HMVP candidate reaches the second entry at the index value 4. Thus, among the HVMP candidates present in the HMVP table 400 at any given time, the HMVP candidate in the second entry at the index value 4 may be the oldest or least recent, while the HMVP candidate in the first entry at the index value 0 may be the youngest or most recent. In general, the HMVP candidate in the second entry may be an older or less recently constructed HMVP candidate than the HMVP candidate in the first entry.

In FIG. 4, different states of the HMVP table 400 are identified with the reference numerals 400A, 400B, and 400C. Referring to the state 400A, HMVP candidates HMVP0 to HMVP4 are shown to be present in entries of the HMVP table 400 at respective index values 4 to 0. For example, HMVP0 may be the oldest or least recent HMVP candidate which was inserted into the HMVP table 400 at the first entry at the index value 0. HMVP0 may be shifted sequentially to make room for the less recently inserted and newer HMVP candidates HMVP1 to HMVP4 until HMVP0 reaches the second entry at the index value 4 shown in the state 400A. Correspondingly, HMVP4 may be the most recent HMVP candidate to be inserted in the first entry at the index value 0. Thus, HMVP0 is an older or less recent HMVP candidate in the HMVP table 400 in relation to HMVP4.

In some examples, one or more of the HMVP candidates HMVP0 to HMVP4 can include motion vector information which can be redundant. For example, a redundant HMVP candidate can include motion vector information which is identical to the motion vector information in one or more other HMVP candidates stored in the HMVP table 400. Since the motion vector information of the redundant HMVP candidate can be obtained from the one or more other HMVP candidates, storing the redundant HMVP candidate in the HMVP table 400 can be avoided. By avoiding the redundant HMVP candidates from being stored in the HMVP table 400, resources of the HMVP table 400 can be utilized more efficiently. In some examples, prior to storing an HMVP candidate in the HMVP table 400, a redundancy check can be performed to determine whether the HMVP candidate would be redundant (e.g., the motion vector information of the HMVP candidate can be compared to the motion vector information of the other HMVP candidates already stored to determine whether there is a match).

In some examples, the state 400B of the HMVP table 400 is a conceptual illustration of the above-described redundancy check. In some examples, the HMVP candidates can be populated in the HMVP table 400 as they are decoded, and the redundancy check can be performed periodically, rather than being performed as a threshold test before the HMVP candidates are stored. For example, as shown in the state 400B, the HMVP candidates HMVP1 and HMVP3 can be identified as redundant candidates (i.e., their motion information is identical to that of one of the other HMVP candidates in the HMVP table 400). The redundant HMVP candidates HMVP1 and HMVP3 can be removed and the remaining HMVP candidates can be shifted accordingly.

For example, as shown in state 400C, the HMVP candidates HMVP2 and HMVP4 are shifted towards higher index values which correspond to older entries, while HMVP0 which is already in the second entry at the second end of the HMVP table 400 is not shown to be shifted further. In some examples, shifting the HMVP candidates HMVP2 and HMVP4 can free up space in the HMVP table 400 for newer HMVP candidates. Accordingly, new HMVP candidates HMVP5 and HMVP6 are shown to be shifted into the HMVP table 400, with HMVP6 being the newest or including the most recently decoded motion vector information, and stored in the first entry at the index value 0.

In some examples, one or more of the HMVP candidates from the HMVP table 400 can be used for constructing other candidate lists which can be used for motion prediction of the current block. For example, one or more HMVP candidates from the HMVP table 400 can be added to a merge candidate list, e.g., as additional merge candidates. In some examples, one or more HMVP candidates from the same HMVP table 400 or another such HMVP table can be added to an Advanced Motion Vector Prediction (AMVP) candidate list, e.g., as additional AMVP predictors.

For example, in a merge candidate list construction process some or all of the HMVP candidates stored in the entries of the HMVP table 400 can be inserted in the merge candidate list. In some examples, inserting the HMVP candidates in the merge candidate list can include inserting the HMVP candidates after a Temporal Motion Vector Predictor (TMVP) candidate in the merge candidate list. As previously discussed with reference to FIG. 3A and FIG. 3B, the TMVP candidate, if enabled and available, can be added into a MV candidate list after spatial motion vector candidates.

In some examples, the above-described pruning process can be applied on the HMVP candidates in constructing the merge candidate list. For example, once a total number of merge candidates in the merge candidate list reaches maximum number of allowable merge candidates, the merge candidate list construction process can be terminated, and no more HMVP candidates may be inserted into the merge candidate list. The maximum number of allowable merge candidates in the merge candidate list can be a predetermined number or a number which may be signaled, e.g., from an encoder to a decoder at which the merge candidate list may be constructed.

In some examples of constructing the merge candidate list, one or more other candidates can be inserted in the merge candidate list. In some examples, the motion information of previously coded blocks which may not be adjacent to the current block can be utilized for more efficient motion vector prediction. For example, non-adjacent spatial merge candidates can be used in constructing the merge candidate list. In some examples, the non-adjacent spatial merge candidates can be inserted before the TMVP candidate in the merge candidate list. In some examples, the non-adjacent spatial merge candidates can be inserted before the TMVP candidate in the same merge candidate list which can include one or more of the HMVP candidates inserted after the TMVP candidate. Identifying and fetching one or more non-adjacent spatial merge candidates which can be inserted into the merge candidate list will be described with reference to FIG. 5 below.

Figure 5:
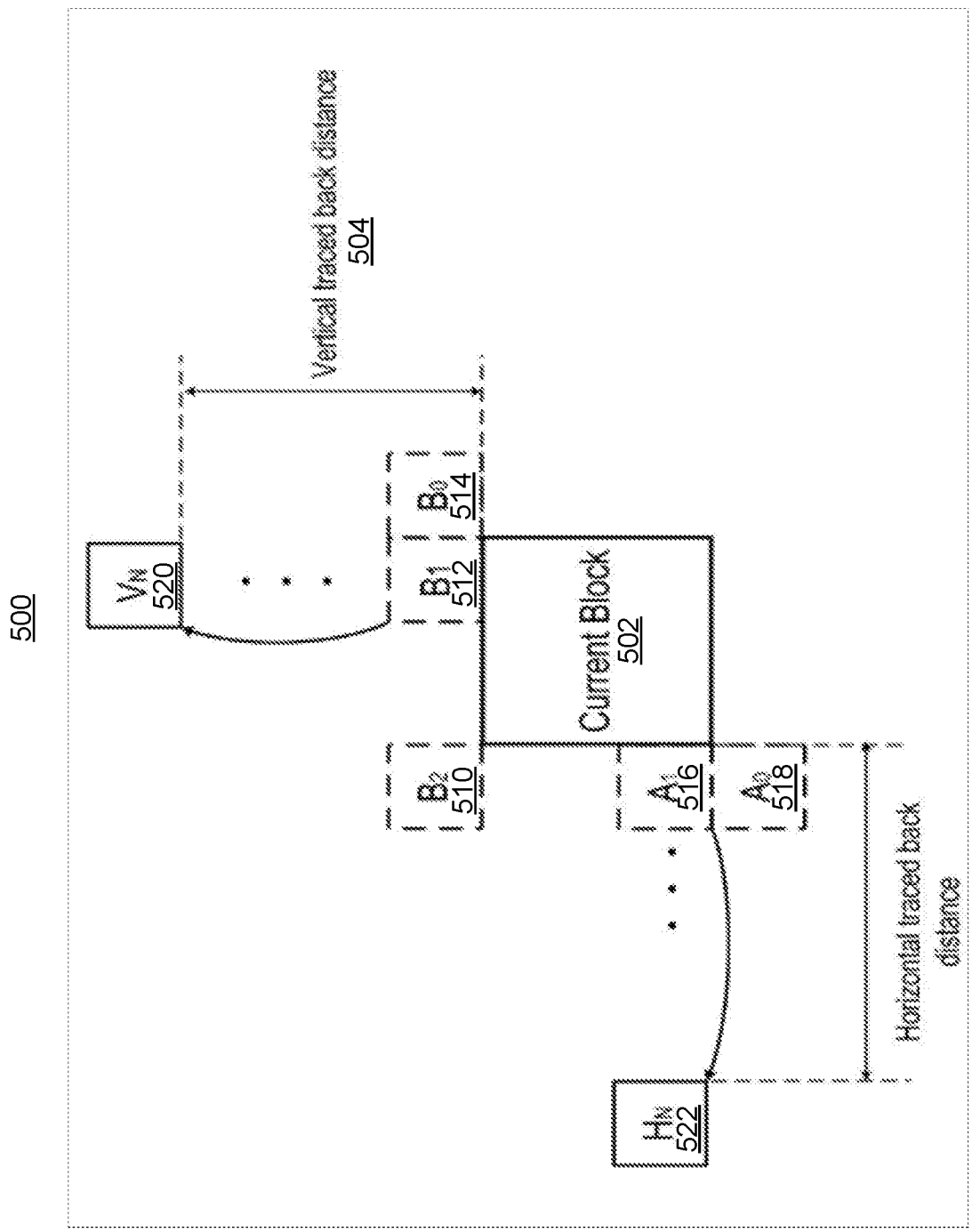
FIG. 5 is a diagram illustrating an example of fetching non-adjacent spatial merge candidates, in accordance with some examples.

FIG. 5 is a block diagram illustrating a picture or slice 500 which includes a current block 502 to be coded. In some examples, a merge candidate list can be constructed for coding the current block 502. For example, motion vectors for the current block can be obtained from one or more merge candidates in the merge candidate list. The merge candidate list can include determining non-adjacent spatial merge candidates. For example, the non-adjacent spatial merge candidates can include new spatial candidates derived from two non-adjacent neighboring positions relative to the current block 502.

Several adjacent or neighboring blocks of the current block 502 are shown, including an above left block $B_2$ 510 (above and to the left of the current block 502), an above block $B_1$ 512 (above the current block 502), an above right block $B_0$ 514 (above and to the right of the current block 502), a left block $A_1$ 516 (to the left of the current block 502), and a left below block $A_0$ 518 (to the left of and below the current block 502). In some examples, the non-adjacent spatial merge candidates can be obtained from one the closest non-adjacent block above and/or to the left of the current block.

In some examples, obtaining non-adjacent spatial merge candidates for the current block 502 can include tracing previously decoded blocks in a vertical direction (above the current block 502) and/or in a horizontal direction (to the left of the current block 502). A vertical traced back distance 504 indicates a vertical distance relative to the current block 502 (e.g., a top boundary of the current block 502) and a vertical non-adjacent block $V_N$ 520. A horizontal traced back distance 506 indicates a horizontal distance relative to the current block 502 (e.g., a left boundary of the current block 502) and a horizontal non-adjacent block $H_N$ 522. The vertical traced back distance 504 and the horizontal traced back distance 506 are restrained to a maximum distance equal to the size of one Coding Tree Unit (CTU).

Non-adjacent spatial merge candidates such as the vertical non-adjacent block $V_N$ 520 and the horizontal non-adjacent block $H_N$ 522 can be identified by tracing the previous decoded blocks in the vertical direction and the horizontal direction, respectively. For example, fetching the vertical non-adjacent block $V_N$ 520 can include a vertical inverse tracing process to determine whether an inter-coded block exists within the vertical traced back distance 504 (constrained to a maximum size of one CTU). If such a block exists, then it is identified as the vertical non-adjacent block $V_N$ 520. In some examples, a horizontal inverse tracing process may be performed subsequent to the vertical inverse tracing process. The horizontal inverse tracing process can include determine whether an inter-coded block exists within the horizontal traced back distance 506 (constrained to a maximum size of one CTU), and if such a block is found, it is identified as the horizontal non-adjacent block $H_N$ 522.

In some examples, one or more of the vertical non-adjacent block $V_N$ 520 and the horizontal non-adjacent block $H_N$ 522 can be fetched for use as non-adjacent spatial merge candidates. A fetching process can include fetching the vertical non-adjacent block $V_N$ 520 if the vertical non-adjacent block $V_N$ 520 is identified in the vertical inverse tracing process. The fetching process can then proceed to the horizontal inverse tracing process. If the vertical non-adjacent block $V_N$ 520 is not identified in the vertical inverse tracing process, then the horizontal inverse tracing process can be terminated when an inter-coded block is encountered or the horizontal traced back distance 506 exceeds the maximum distance. If the vertical non-adjacent block $V_N$ 520 is identified and fetched, then the horizontal inverse tracing process is terminated when an inter-coded block which contains a different MV than the MV contained in the vertical non-adjacent block $V_N$ 520 is encountered or if the horizontal traced back distance 506 exceeds the maximum distance. As previously noted, one or more of the fetched non-adjacent spatial merge candidates such as the vertical non-adjacent block $V_N$ 520 and the horizontal non-adjacent block $H_N$ 522 are added before the TMVP candidate in the merge candidate list.

Referring back to FIG. 4, in some cases, the HMVP candidates can also be used in constructing an AMVP candidate list. In an AMVP candidate list construction process, some or all of the HMVP candidates stored in the entries of the same HMVP table 400 (or a different HMVP table than the one used for the merge candidate list construction) can be inserted in the AMVP candidate list. In some examples, inserting the HMVP candidates in the AMVP candidate list can include inserting a set of entries (e.g., a number of k most recent or least recent entries) of the HMVP candidates after the TMVP candidate in the AMVP candidate list. In some examples, the above-described pruning process can be applied on the HMVP candidates in constructing the AMVP candidate list. In some examples, only those HMVP candidates with a reference picture which is the same as an AMVP target reference picture may be used to construct the AMVP candidate list.

Accordingly, the History-Based Motion Vector Predictor (HMVP) prediction mode can involve the use of a history-based lookup table such as the HMVP table 400 which includes one or more HMVP candidates. The HMVP candidates can be used in inter-prediction modes, such as the merge mode and the AMVP mode. In some examples, different inter-prediction modes can use different methods to select HMVP candidates from the HMVP table 400.

Systems, apparatuses, methods (also referred to as processes), and computer-readable media are described herein that are related to inter-prediction in video codecs. For example, as described in more detail herein, the techniques described herein are related to Decoder-side Motion Vector Refinement (DMVR). In some cases, the techniques can be performed by one or more of the encoding device 104, the decoding device 112, or a combination thereof. In some examples, the techniques may be applied to any of the existing video codecs, such as HEVC (High Efficiency Video Coding) and VVC (Versatile Video Coding), or may be an efficient coding tool in any future video coding standards.

In some examples, the disclosed techniques can also be utilized in intra-block copy (IBC) prediction. In IBC prediction, or in an IBC mode, a previously encoded block within a frame can be used as a predictor for the current block. In some examples, the previously encoded blocks can be obtained from the HMVP table. In some examples, the IBC prediction can utilize redundancy in an image frame or picture and perform block matching to predict a block of samples (e.g., a CU, a PU, or other coding block) as a displacement from a reconstructed block of samples in a neighboring region of the image frame. By removing redundancy from repeating patterns of content, the IBC prediction can improve coding efficiency.

In some examples, in inter-prediction or intra-block copy prediction, different inter-prediction modes (e.g., merge mode, AMVP mode, and/or other inter-prediction modes) can share a same HMVP table. In some cases, the different inter-prediction modes can use the same or different methods to select candidates from the HMVP table.

As previously mentioned, the HMVP candidates may be inserted into the HMVP table in a FIFO manner. For example, an older or less recent HMVP candidate may be inserted into the HMVP table before a younger or more recent HMVP candidate is inserted into the HMVP table. The HMVP table can include two or more entries to store two or more HMVP candidates, where the two or more entries may have two or more associated index values. In some examples, the index values can follow an index order which can be an ascending order from the lowest index value (e.g., "0") to the highest index value (e.g., "N−1", where the HMVP table has N entries). In some examples of the FIFO implementation, the HMVP candidates may be shifted from entries associated with lower index values to entries associated with higher index values as newer or more recent HMVP candidates are inserted into the HMVP table. Thus, at any point in time, an entry of the HMVP table with a higher index value can include an older or less recent HMVP candidate than an entry with a lower index value. For example, a second entry associated with a second index value can include a less recent HMVP candidate and a first entry associated with a first index value can include a more recent HMVP candidate where the first index value is lower than the second index value.

In some examples, selection of HMVP candidates from the HMVP table for the different prediction modes can be based on a selection order associated with the HMVP candidates. In some examples, the selection order can be defined with respect to the index order with ascending index values. In an example where the index values in the index order include a first index value which is lower than a second index value in an ascending order of index values, the term "forward order" can include a selection order in which a first HMVP candidate in a first entry with the first index value is selected before a second HMVP candidate in a second entry with the second index value. Correspondingly, the term "reverse order" can include a selection order which is a reverse order, where the second HMVP candidate in the second entry with the second index value is selected before the first HMVP candidate in the first entry with the first index value. As previously mentioned, the second entry associated with the second index value can include a less recent HMVP candidate and the first entry associated with the first index value can include a more recent HMVP candidate. It will be understood that in the examples discussed herein, the forward order and reverse order can be relative terms which are not meant to convey any absolute direction or inherent limitation.

In some examples, referring to the HMVP table 400 of FIG. 4 (e.g., in the state 400A), the oldest or least recent HMVP candidate (HMVP0) may be present at the second entry associated with the highest index value (4) among the set of index values 0 to 4. The youngest HMVP or most recent HMVP candidate (HMVP4) may be present at the first entry associated with the lowest index value (0) among the set of index values 0 to 4. Thus, the forward order can include selecting HMVP candidates associated with index values starting from the lowest index value and continuing towards the highest index value. For example, selecting HMVP candidates from the HMVP table 400 in the forward order can include selecting HMVP candidates in an order where the most recent HMVP candidate at the first entry (associated with the lowest index value) is selected before the least recent HMVP candidate at the second entry (associated with the highest index value). Correspondingly, a reverse order can include selecting HMVP candidates associated with index values starting from the highest index value and continuing towards the lowest index value. For example, selecting HMVP candidates from the HMVP table 400 in the reverse order can include selecting HMVP candidates in an order where the least recent HMVP candidate at the second entry (associated with the highest index value) is selected before the most recent HMVP candidate at the first entry (associated with the lowest index value). In some examples, selecting HMVP candidates according to different methods for different prediction modes can include selecting the HMVP candidates according to different orders selected from the forward order or the reverse order.

In some examples, selecting HMVP candidates according to different methods for different prediction modes can also include selecting the HMVP candidates from the HMVP table in accordance with different "subsampling rates." In this disclosure, selecting the HMVP candidates from an HMVP table based on a subsampling rate refers to selecting the HMVP candidates, in either the forward order or the reverse order, from entries of the HMVP table whose indexes may be spaced apart by a certain interval. For example, a subsampling rate of "1" could mean selecting HMVP candidates from entries associated with sequential index locations. For example, HMVP candidates selected at the subsampling rate of "1" may include HMVP candidates selected from entries of the HMVP table whose index values have no gaps between them (in either the forward order or the reverse order). Similarly, a subsampling rate of R (where R is a positive integer) can include selecting HMVP candidates from entries of the HMVP table whose index values are separated by R for consecutive HMVP candidates selected (in either the forward order or the reverse order). While subsampling is discussed in detail herein with regular intervals or gaps or a constant subsampling rate, it is possible to have a variable subsampling rate where the interval or gap can change between index values of HMVP candidates selected.

As previously mentioned, the merge candidate list and the AMVP candidate list can be constructed from the same HMVP table or from different HMVP tables. Further, constructing the merge candidate list and the AMVP candidate list can include the same method or different methods, where different methods can involve different order of selection and/or different subsampling rates.

In some examples, the merge candidates in the merge candidate list can use the same motion vectors as those obtained from the HMVP candidates selected for constructing the merge candidate list. For example, in the merge mode, motion vector prediction can include inheriting motion information from temporally co-located candidates. In some examples, the motion vector predictors included in the most recent HMVP candidates may have a stronger correlation with the current block for which motion vectors are being derived for inter-prediction in the merge mode. Accordingly, in some examples, the merge candidate list construction can follow the forward order of selecting HMVP candidates, where the more recent HMVP candidates are selected before less recent HMVP candidates.

In some examples, the motion vectors for the AMVP candidates in the AMVP candidate list can be predicted from the motion vectors included in the HMVP candidates. In some examples, the most recent HMVP candidate in the HMVP table may have less correlation with a current block being predicted using the AMVP mode than a less recent HMVP candidate. In VVC, for instance, using less recent candidates in the HMVP table for AMVP can lead to more accurate predictions. For example, an older HMVP candidate can include motion vectors which may be more useful in predicting the motion vectors for a current block in the AMVP mode. In some examples, using the less recent or older HMVP candidates for the AMVP mode prediction can lead to coding efficiencies. Accordingly, in some examples, the AMVP candidate list construction can follow the reverse order where the less recent HMVP candidates are selected before the more recent HMVP candidates.

Different examples of the above-described techniques will now be described with reference to FIG. 6A, FIG. 6B, FIG. 7A, and FIG. 7B. In these examples, different inter-prediction modes are described which can share the same HMVP table, but use different selection methods to select candidates from the table. In the following illustrative examples, the size of the HMVP table can be denoted as N, the subsampling rate can be denoted as R, and index_start can denote the initial index value in the HMVP table from which candidate selection may begin in one of a forward order or a reverse order. Any suitable values can be assigned to the parameters index_start, N, and R.

FIG. 6A and FIG. 6B are block diagrams which illustrate an HMVP table 600 according to example aspects of this disclosure. The HMVP table 600 is shown with 16 entries whose index values range from 0 to 15. For example, the size of the HMVP table 600 may be represented as N=16 using the above-mentioned notation. The entries of the HMVP table 600 include HMVP candidates similar to the HMVP candidates of the HMVP table 400 described with reference to FIG. 4. In the HMVP table 600, 16 HMVP candidates, HMVP0 to HMVP15, are shown, which may have been populated in a FIFO fashion, with HMVP0 being the oldest or least recent candidate at a second entry with the index value 15 and HMVP15 being the youngest or most recent candidate at a first entry with the index value 0. As previously described, a forward order of selecting the HMVP candidates can include a direction where the first entry would be selected before the second entry (even though one or more of the first entry or the second entry themselves may not be selected, based on the index_start and subsampling rates). Similarly, a reverse order of selecting the HMVP candidates can include a direction where the second entry would be selected before the first entry (even though one or more of the first entry or the second entry themselves may not be selected, based on the index_start and subsampling rates).

In FIG. 6A, an illustrative example is shown for constructing a merge candidate list 602 by selecting HMVP candidates from the HMVP table 600 in a forward order. In FIG. 6B, an illustrative example is shown for constructing a merge candidate list 604 by selecting HMVP candidates from the HMVP table 600 in a reverse order. It is understood that the merge candidate lists 602 and 604 can include one or more merge candidates in addition to those obtained from the HMVP table 600, although they are not illustrated. For example, the merge candidate list 602 and/or the merge candidate list 604 can also include a Temporal Motion Vector Predictor (TMVP) candidate and one or more non-adjacent spatial merge candidates such as the vertical non-adjacent block $V_N$ 520 and the horizontal non-adjacent block $H_N$ 522 described with reference to FIG. 5.

In FIG. 6A, constructing the merge candidate list 602 can include selecting HMVP candidates in the forward order using the parameters, index_start=3, N=16, R=4. In such an example, using the forward order to select candidates from the HMVP table 600, can lead to the selected candidates from index values in the set {3, 7, 11, 15} forming the merge candidate list 602. For instance, the index_start value of 3 indicates that the first merge candidate in the merge candidate list 602 is HMVP12 obtained from an entry associated with the index value 3 in the HMVP table 600. Since the subsampling rate is R=4, the HMVP candidates are selected with a gap of 4 index values between consecutive HMVP candidates selected. Thus, the next merge candidate in the merge candidate list 602 is HMVP8 obtained from an entry associated with the index value 7 in the HMVP table 600. Similarly, the next two merge candidates in the merge candidate list 602 are HMVP4 and HMVP0 respectively obtained from entries associated with the index values 11 and 15 in the HMVP table 600.

In FIG. 6B, constructing the merge candidate list 604 can include selecting HMVP candidates in the reverse order using the parameters, index_start=13, N=16, R=4. In such an example, using the reverse order to select candidates from the HMVP table 600, can lead to the selected candidates from index values in the set {13, 9, 5, 1} forming the merge candidate list 604. For example, the merge candidate list 604 formed using the above selection process can include the HMVP candidates HMVP2, HMVP6, HMVP10, and HMVP14 respectively obtained from the entries of the HMVP table 600 at the index values 13, 9, 5, and 1.

FIG. 7A and FIG. 7B are block diagrams which illustrate an HMVP table 700 according to example aspects of this disclosure. The HMVP table 700 is shown with 16 entries whose index values range from 0 to 15. For example, the size of the HMVP table 700 may be represented as N=16 using the above-mentioned notation. The entries of the HMVP table 700 include HMVP candidates similar to the HMVP candidates of the HMVP table 400 described with reference to FIG. 4. In the HMVP table 700, 16 HMVP candidates, HMVP0 to HMVP15, are shown, which may have been populated in a FIFO fashion, with HMVP0 being the oldest or least recent candidate at a second entry with the index value 15 and HMVP15 being the youngest or most recent candidate at a first entry with the index value 0. As previously described, a forward order of selecting the HMVP candidates can include a direction where the first entry would be selected before the second entry (even though one or more of the first entry or the second entry themselves may not be selected, based on the index_start and subsampling rates). Similarly, a reverse order of selecting the HMVP candidates can include a direction where the second entry would be selected before the first entry (even though one or more of the first entry or the second entry themselves may not be selected, based on the index_start and subsampling rates).

In FIG. 7A, an illustrative example is shown for constructing an AMVP candidate list 702 by selecting HMVP candidates from the HMVP table 700 in a forward order. In FIG. 7B, an illustrative example is shown for constructing an AMVP candidate list 704 by selecting HMVP candidates from the HMVP table 700 in a reverse order. In FIGS. 7A and 7B, the values of index_start, N, and R used for the AMVP mode can be the same (or different) as those described with reference to FIGS. 6A and 6B for the merge mode.

For example, in FIG. 7A, constructing the AMVP candidate list 702 can include selecting HMVP candidates in the forward order using the parameters, index_start=1, N=16, R=4. In such an example, using the forward order to select candidates from the HMVP table 700, can lead to the selected candidates from index values in the set {1, 5, 9, 13} forming the AMVP candidate list 702. For instance, the index_start value of 1 indicates that the first AMVP candidate in the AMVP candidate list 702 is HMVP14 obtained from an entry associated with the index value 1 in the HMVP table 700. Since the subsampling rate is R=4, the HMVP candidates are selected with a gap of 4 index values between consecutive HMVP candidates selected. Thus, the next AMVP candidate in the AMVP candidate list 702 is HMVP10 obtained from an entry associated with the index value 5 in the HMVP table 700. Similarly, the next two AMVP candidates in the AMVP candidate list 702 are HMVP6 and HMVP2 respectively obtained from entries associated with the index values 9 and 13 in the HMVP table 700.

In FIG. 7B, constructing the AMVP candidate list 704 can include selecting HMVP candidates in the reverse order using the parameters, index_start=15, N=16, R=1. As previously mentioned, R=1 can be referred to as a subsampling rate of 1, which effectively means no subsampling being applied. In such an example, using the reverse order to select candidates from the HMVP table 700, can lead to the selected candidates from index values in the set {15, 14, 13, 12} forming the AMVP candidate list 704. For example, the AMVP candidate list 704 formed using the above selection process can include the HMVP candidates HMVP0, HMVP1, HMVP2, and HMVP3 respectively obtained from the entries of the HMVP table 700 at the index values 15, 14, 13, and 12.

Accordingly, in some examples, different inter-prediction modes can include different methods of selecting candidates from the HMVP table. For example, the merge candidate list 602 of FIG. 6A can be constructed by selecting HMVP candidates from the HMVP table 600 in the forward order with a subsampling rate of R=4, and the AMVP candidate list 704 can be constructed by selecting HMVP candidates from the HMVP table 700 in the reverse order with a subsampling rate of R=1. In general, selecting candidates in the forward order can lead to HMVP candidates selected from the HMVP table from entries whose index values belong to the set {index_start, index_start+R, index_start+2R, . . . }, and selecting candidates in the reverse order can lead to HMVP candidates selected from the HMVP table from entries whose index values belong to the set {N-index_start, N-index_start-R, N-index_start-2R, . . . }.

In some examples, different inter-prediction modes can use different HMVP tables. For example, in the merge mode, a single HMVP table (e.g., HMVP table 600) can be used for constructing the merge candidate list where the candidates in the HMVP table 600 include the motion information of previously coded inter-predicted CUs. For instance, if the previously coded inter-predicted CU is predicted using bi-direction prediction, the HMVP candidates in the HMVP table 600 can include the motion information in both prediction directions.

In another illustrative example, in an AMVP mode of bi-direction prediction, two HMVP tables can be used for obtaining motion information for each direction. For instance, one AMVP candidate list can be constructed to include the motion information of list 0, and another AMVP candidate list can be constructed to include the motion information of list 1.

Figure 8:
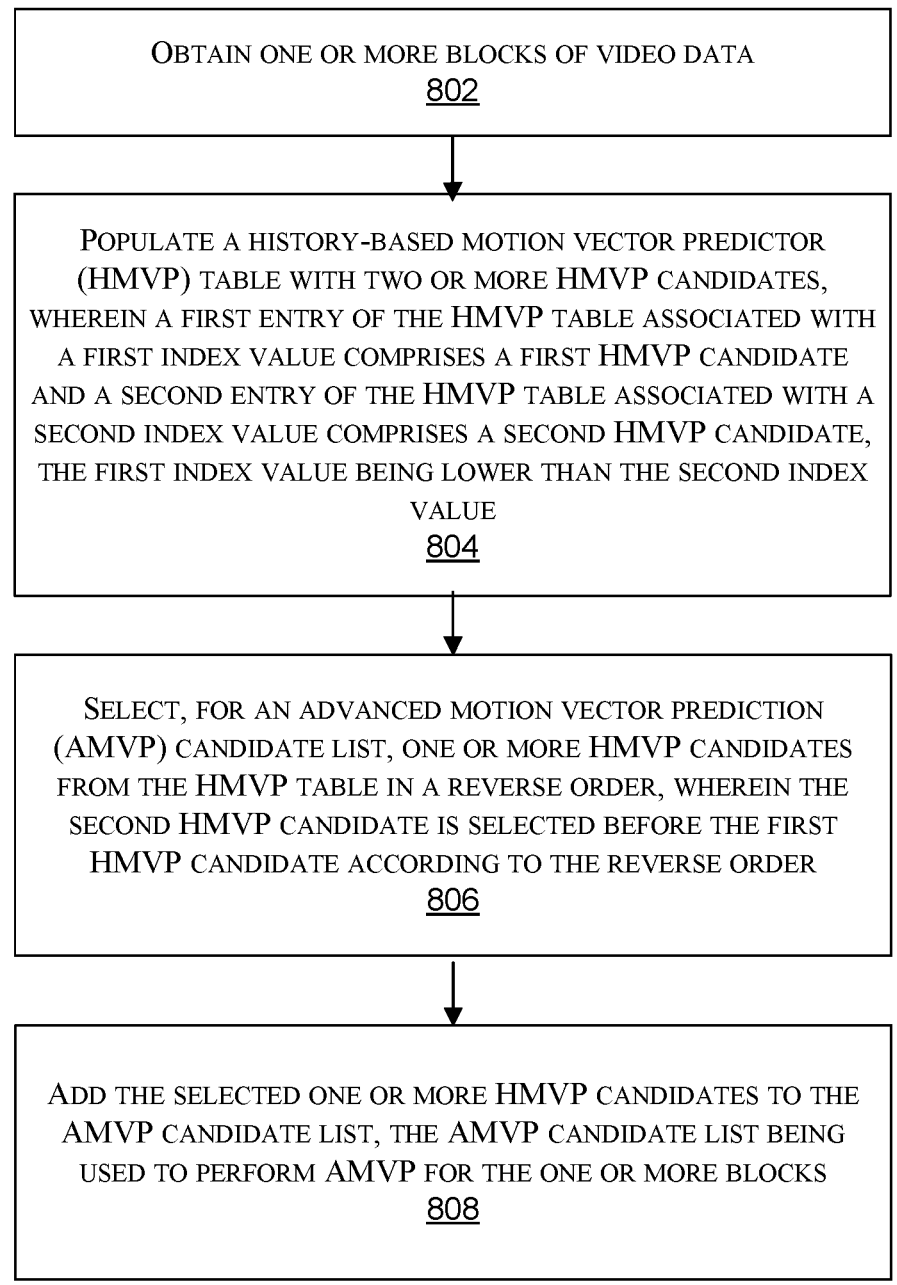
FIG. 8 is a flowchart illustrating another example of a process of processing video data, in accordance with some embodiments.

FIG. 8 is a flowchart illustrating an example of a process 800 for processing video data using the history-based motion vector prediction techniques described herein. The process 800 can be performed by a video decoder, such as the decoding device 112 of FIG. 1 and/or FIG. 10. In some cases, when the process 800 is performed by a video decoder, the video data can include a picture or a portion (e.g., one or more blocks) of the picture to be decoded from an encoded video bitstream.

At block 802, the process 800 includes obtaining one or more blocks of video data. The block of video data can include a CU, a TU, a PU, or other block of video data. For example, the video data can include block based video data in which video blocks are coded with respect to other blocks using motion vectors stored in a history-based motion vector table.

At block 804, the process 800 includes populating a history-based motion vector predictor (HMVP) table with two or more HMVP candidates, wherein a first entry of the HMVP table associated with a first index value comprises a first HMVP candidate and a second entry of the HMVP table associated with a second index value comprises a second HMVP candidate, the first index value being lower than the second index value in an index order. For example, the process 800 can populate a history-based motion vector predictor (HMVP) table 700 with two or more HMVP candidates such as the HMVP candidates HMVP0 to HMVP15. For example, a first entry of the HMVP table associated with a first index value (0) can include a first HMVP candidate HMVP15 and a second entry of the HMVP table associated with a second index value (15) can include a second HMVP candidate HMVP0, where the first index value 0 is lower than the second index value 15 in an index order. In some examples, the first HMVP candidate HMVP15 can be a most recent HMVP candidate in the HMVP table 700 and include motion information decoded at a first time, and the second HMVP candidate HMVP0 can be a least recent HMVP candidate in the HMVP table 700 and include motion information decoded at a second time, where the first time is later in time than the second time.

At block 806, the process 800 includes selecting, for an advanced motion vector prediction (AMVP) candidate list, one or more HMVP candidates from the HMVP table in a reverse order, wherein the second HMVP candidate is selected before the first HMVP candidate according to the reverse order. For example, the process 800 can select, for the AMVP candidate list 704, one or more HMVP candidates HMVP0 to HMVP3 from the HMVP table 700 in a reverse order as shown in FIG. 7B. In such an example, the second HMVP candidate HMVP0 would be selected before the first HMVP candidate HMVP15 according to the reverse order (although only HMVP0 to HMVP3 are shown in the AMVP candidate list 704 of FIG. 7B).

At block 808, the process 800 includes adding the selected one or more HMVP candidates to the AMVP candidate list, the AMVP candidate list being used to perform AMVP for the one or more blocks. For example, the process 800 can add the selected one or more HMVP candidates HMVP0 to HMVP3 to the AMVP candidate list 704, the AMVP candidate list 704 being used to perform AMVP for the one or more blocks of the video data. In some examples, the one or more blocks can include a current block to be predicted using one or more AMVP candidates of the AMVP candidate list 704.

In some examples, selecting the one or more HMVP candidates from the HMVP table in the reverse order for the AMVP candidate list 704 can include selecting the one or more HMVP candidates HMVP0 to HMVP3 from consecutive entries of the HMVP table associated with consecutive index values 15 to 12, without performing subsampling of the entries during the selection. For example, a subsampling rate of R=1 can indicate not performing subsampling of the entries during the selection.

In some examples, a merge candidate list can also be constructed from the same HMVP table used for constructing the AMVP candidate list or from a different HMVP table. In an example, the HMVP table 600 shown in FIG. 6A can be the same HMVP table as the HMVP table 700 of FIG. 7B. In some examples, the merge candidate list 602 can be constructed by selecting one or more HMVP candidates HMVP12, HMVP8, HMVP4, and HMVP0 from the HMVP table 600 in a forward order. According to the forward order, a first HMVP candidate HMVP15 in a first entry of the HMVP table 600 associated with a first index value (0) can be selected before a second HMVP candidate HMVP0 in a second entry of the HMVP table 600 associated with a second index value (15), even though one or more both of the HMVP candidates HMVP15 and HMVP0 need not actually be selected. In some examples, the selected one or more HMVP candidates HMVP12, HMVP8, HMVP4, and HMVP0 can be added to the merge candidate list 602, the merge candidate list 602 being used to perform merge prediction for the one or more blocks. In such examples, selecting the one or more HMVP candidates HMVP12, HMVP8, HMVP4, and HMVP0 from the HMVP table 600 in the forward order can include subsampling of the entries using a subsampling rate R=4, where a separation based on the subsampling rate is maintained between index values {3, 7, 11, 15} associated with entries from which consecutive HMVP candidates are selected.

In some examples, the size of the HMVP table (N), the subsampling rate (R), the initial position (index_start), the number of HMVP tables, and/or the selection methods can be predefined in both the encoder side and the decoder side, or can be set as one or more values signaled from the encoder to the decoder at the sequence level (e.g., a SPS or other sequence level signaling), picture level (e.g., a PPS or other picture level signaling), slice level (e.g., a slice header or other slice level signaling), block level, or other suitable signaling. In some examples, the one or more values for the different parameters can be signaled in Sequence Parameter Set (SPS), Picture Parameter Set (PPS), Slice Header (SH), Coding Tree Unit (CTU) or Coding Unit (CU).

In some examples, the processes described herein may be performed by a computing device or an apparatus, such as the encoding device 104, the decoding device 112, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 9:
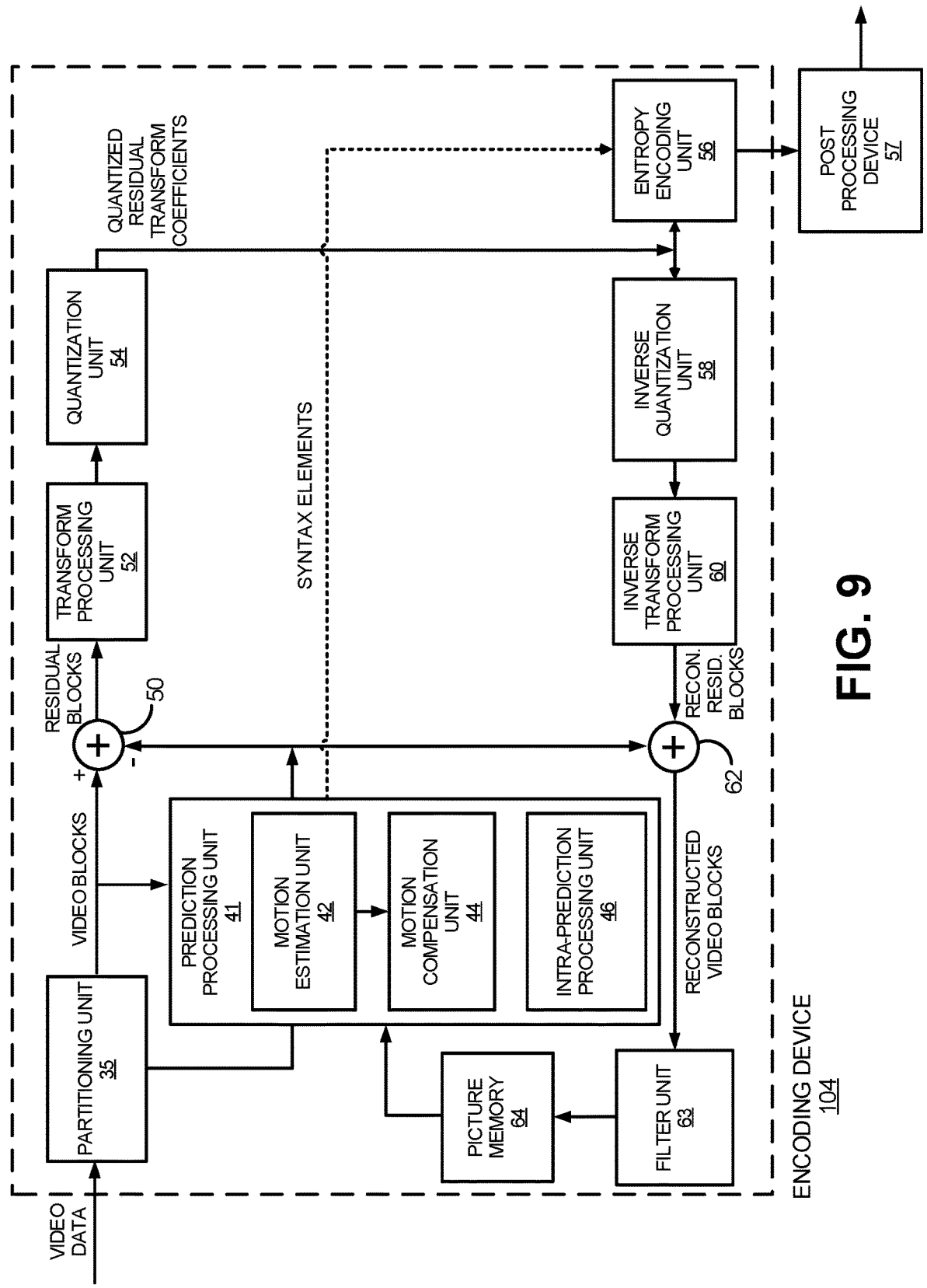
FIG. 9 is a block diagram illustrating an example encoding device, in accordance with some examples.
Figure 10:
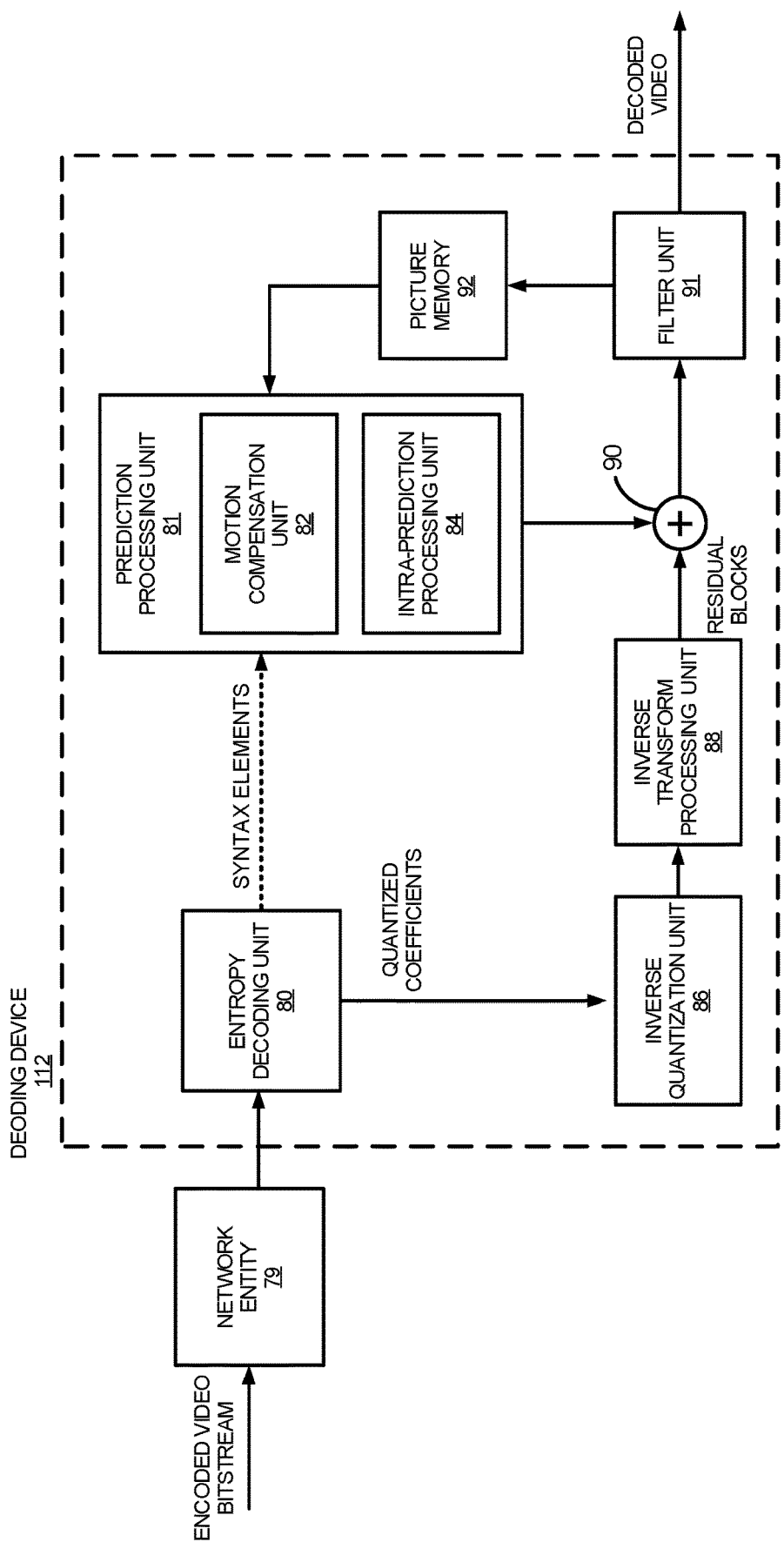
FIG. 10 is a block diagram illustrating an example video decoding device, in accordance with some examples.

Specific details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by the sum of absolute difference (SAD), the sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (list 0) or a second reference picture list (list 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion-compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 9 represents an example of a video encoder configured to perform one or more of the transform coding techniques described herein. The encoding device 104 may perform any of the techniques described herein, including the processes described above with respect to FIG. 8.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra-prediction processing unit 84. The decoding device 112 may, in some examples, perform a decoding pass generally reciprocal to the encoding pass described with respect to the encoding device 104 from FIG. 9.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, list 0 and list 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 10 represents an example of a video decoder configured to perform one or more of the transform coding techniques described herein. The decoding device 112 may perform any of the techniques described herein, including the process 800 described above with respect to FIG. 8.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set or "one or more of" a set indicates that one member of the set or multiple members of the set satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:

obtaining one or more blocks of video data;

populating a history-based motion vector predictor (HMVP) table with two or more HMVP candidates, wherein a first entry of the HMVP table associated with a first index value comprises a first HMVP candidate including motion information decoded at a first time, and wherein a second entry of the HMVP table associated with a second index value comprises a second HMVP candidate including motion information decoded at a second time, the first index value being different than the second index value and the first time being different than the second time;

selecting, for an advanced motion vector prediction (AMVP) candidate list and without performing sub-sampling of entries of the HMVP table, a first set of HMVP candidates from the HMVP table in a reverse order from consecutive entries of the HMVP table associated with consecutive index values, wherein the second HMVP candidate is selected before the first HMVP candidate according to the reverse order;

adding the first set of HMVP candidates to the AMVP candidate list, the AMVP candidate list being used to perform AMVP for the one or more blocks;

selecting, for a merge candidate list, a second set of HMVP candidates from the HMVP table in a forward order, wherein the first HMVP candidate is selected before the second HMVP candidate according to the forward order; and adding the second set of HMVP candidates to the merge candidate list after adding a temporal motion vector predictor (TMVP) candidate to the merge candidate list, the merge candidate list being used to perform merge prediction for the one or more blocks.

2. The method of claim 1, wherein the selecting the second set of HMVP candidates from the HMVP table in the forward order comprises subsampling of entries of the HMVP table using a subsampling rate, wherein a separation based on the subsampling rate is maintained between index values associated with entries of the HMVP table from which consecutive HMVP candidates are selected.

3. The method of claim 1, wherein the two or more HMVP candidates comprise motion information for both prediction directions of bi-direction prediction.

4. The method of claim 1, wherein at least two HMVP tables are used in an AMVP mode with bi-prediction.

5. The method of claim 4, wherein a first HMVP table is used for a first reference picture list, and wherein a second HMVP table is used for a second reference picture list.

6. The method of claim 1, wherein the AMVP includes an intra-block copy AMVP prediction mode.

7. The method of claim 1, wherein the method is performed by a decoder, and wherein the video data is obtained from an encoded video bitstream.

8. The method of claim 1, wherein the method is performed by an encoder.

9. An apparatus for processing video data, the apparatus comprising:
a memory; and
a processor implemented in circuitry and configured to:
obtain one or more blocks of video data;
populate a history-based motion vector predictor (HMVP) table with two or more HMVP candidates, wherein a first entry of the HMVP table associated with a first index value comprises a first HMVP candidate including motion information decoded at a first time, and wherein a second entry of the HMVP table associated with a second index value comprises a second HMVP candidate including motion information decoded at a second time, the first index value being different than the second index value and the first time being different than the second time;
select, for an advanced motion vector prediction (AMVP) candidate list and without performing subsampling of entries of the HMVP table, a first set of HMVP candidates from the HMVP table in a reverse order from consecutive entries of the HMVP table associated with consecutive index values, wherein the second HMVP candidate is selected before the first HMVP candidate according to the reverse order;
add the first set of HMVP candidates to the AMVP candidate list, the AMVP candidate list being used to perform AMVP for the one or more blocks;
select, for a merge candidate list, a second set of HMVP candidates from the HMVP table in a forward order, wherein the first HMVP candidate is selected before the second HMVP candidate according to the forward order; and
add the second set of HMVP candidates to the merge candidate list after adding a temporal motion vector predictor (TMVP) candidate to the merge candidate list, the merge candidate list being used to perform merge prediction for the one or more blocks.

10. The apparatus of claim 9, wherein the selecting the second set of HMVP candidates from the HMVP table in the forward order comprises subsampling of entries of the HMVP table using a subsampling rate, wherein a separation based on the subsampling rate is maintained between index values associated with entries of the HMVP table from which consecutive HMVP candidates are selected.

11. The apparatus of claim 9, wherein the two or more HMVP candidates comprise motion information for both prediction directions of bi-direction prediction.

12. The apparatus of claim 9, wherein at least two HMVP tables are used in an AMVP mode with bi-prediction.

13. The apparatus of claim 12, wherein a first HMVP table is used for a first reference picture list, and wherein a second HMVP table is used for a second reference picture list.

14. The apparatus of claim 9, wherein the AMVP includes an intra-block copy AMVP prediction mode.

15. The apparatus of claim 9, wherein the apparatus comprises a decoder, and wherein the video data is obtained from an encoded video bitstream.

16. The apparatus of claim 9, wherein the apparatus comprises an encoder.

17. A non-transitory computer-readable medium having stored thereon instructions that, when executed by one or more processors, cause the one or more processors to:
obtain one or more blocks of video data;
populate a history-based motion vector predictor (HMVP) table with two or more HMVP candidates, wherein a first entry of the HMVP table associated with a first index value comprises a first HMVP candidate including motion information decoded at a first time, and wherein a second entry of the HMVP table associated with a second index value comprises a second HMVP candidate including motion information decoded at a second time, the first index value being different than the second index value and the first time being different than the second time;
select, for an advanced motion vector prediction (AMVP) candidate list and without performing subsampling of entries of the HMVP table, a first set of HMVP candidates from the HMVP table in a reverse order from consecutive entries of the HMVP table associated with consecutive index values, wherein the second HMVP candidate is selected before the first HMVP candidate according to the reverse order;
add the first set of HMVP candidates to the AMVP candidate list, the AMVP candidate list being used to perform AMVP for the one or more blocks;
select, for a merge candidate list, a second set of HMVP candidates from the HMVP table in a forward order, wherein the first HMVP candidate is selected before the second HMVP candidate according to the forward order; and
add the second set of HMVP candidates to the merge candidate list after adding a temporal motion vector predictor (TMVP) candidate to the merge candidate list, the merge candidate list being used to perform merge prediction for the one or more blocks.

18. The non-transitory computer-readable medium of claim 17, wherein the selecting the second set of HMVP candidates from the HMVP table in the forward order comprises subsampling of entries of the HMVP table using a subsampling rate, wherein a separation based on the subsampling rate is maintained between index values associated with entries of the HMVP table from which consecutive HMVP candidates are selected.

19. The non-transitory computer-readable medium of claim 17, wherein the two or more HMVP candidates comprise motion information for both prediction directions of bi-direction prediction.

20. The non-transitory computer-readable medium of claim 17, wherein at least two HMVP tables are used in an AMVP mode with bi-prediction.

21. The non-transitory computer-readable medium of claim 20, wherein a first HMVP table is used for a first reference picture list, and wherein a second HMVP table is used for a second reference picture list.

22. The non-transitory computer-readable medium of claim 17, wherein the AMVP includes an intra-block copy AMVP prediction mode.

23. An apparatus for processing video data, the apparatus comprising:
  means for obtaining one or more blocks of video data;
  means for populating a history-based motion vector predictor (HMVP) table with two or more HMVP candidates, wherein a first entry of the HMVP table associated with a first index value comprises a first HMVP candidate including motion information decoded at a first time, and wherein a second entry of the HMVP table associated with a second index value comprises a second HMVP candidate including motion information decoded at a second time, the first index value being different than the second index value and the first time being different than the second time;
  means for selecting, for an advanced motion vector prediction (AMVP) candidate list and without performing subsampling of entries of the HMVP table, a first set of HMVP candidates from the HMVP table in a reverse order from consecutive entries of the HMVP table associated with consecutive index values, wherein the second HMVP candidate is selected before the first HMVP candidate according to the reverse order;
  means for adding the first set of HMVP candidates to the AMVP candidate list, the AMVP candidate list being used to perform AMVP for the one or more blocks;
  means for selecting, for a merge candidate list, a second set of HMVP candidates from the HMVP table in a forward order, wherein the first HMVP candidate is selected before the second HMVP candidate according to the forward order; and
  means for adding the second set of HMVP candidates to the merge candidate list after adding a temporal motion vector predictor (TMVP) candidate to the merge candidate list, the merge candidate list being used to perform merge prediction for the one or more blocks.

24. The apparatus of claim 23, wherein the selecting the second set of HMVP candidates from the HMVP table in the forward order comprises subsampling of entries of the HMVP table using a subsampling rate, wherein a separation based on the subsampling rate is maintained between index values associated with entries of the HMVP table from which consecutive HMVP candidates are selected.

25. The apparatus of claim 23, wherein the two or more HMVP candidates comprise motion information for both prediction directions of bi-direction prediction.

26. The apparatus of claim 23, wherein at least two HMVP tables are used in an AMVP mode with bi-prediction.

27. The apparatus of claim 26, wherein a first HMVP table is used for a first reference picture list, and wherein a second HMVP table is used for a second reference picture list.

28. The apparatus of claim 23, wherein the AMVP includes an intra-block copy AMVP prediction mode.

* * * * *